United States Patent [19]

Bhatti

[11] 4,441,903

[45] Apr. 10, 1984

[54] METHOD OF MAKING GLASS FIBER FORMING FEEDERS AND FEEDER FORMED THEREBY

[75] Inventor: Mohinder S. Bhatti, Newark, Ohio

[73] Assignee: Owens-Corning Fiberglas Corporation, Toledo, Ohio

[21] Appl. No.: 452,273

[22] Filed: Dec. 22, 1982

[51] Int. Cl.³ .......................................... C03B 37/095
[52] U.S. Cl. ........................................ 65/1; 29/445; 65/2; 65/374.12; 156/272.2; 228/242; 228/243; 228/263.19; 427/193; 427/204; 427/397.8; 428/670; 428/940
[58] Field of Search ................. 65/1, 2, 374.12; 156/272; 428/670, 940; 29/445; 228/242, 243, 263.19; 427/193, 204, 397.8

[56] References Cited

U.S. PATENT DOCUMENTS

| 4,342,577 | 8/1982 | Bhatti et al. | 65/1 |
| 4,342,578 | 8/1982 | Bhatti et al. | 65/1 |
| 4,343,636 | 8/1982 | Bhatti | 65/1 |
| 4,351,858 | 9/1982 | Hunold et al. | 427/193 |

OTHER PUBLICATIONS

Hot Isostatic Processing MCIC-77-34 Battelle Labs., Columbus, Ohio, Nov. 1977, pp. 1-99.

Primary Examiner—Robert L. Lindsay, Jr.
Attorney, Agent, or Firm—Ronald C. Hudgens; Robert F. Rywalski; Greg Dziegielewski

[57] ABSTRACT

A method of making an orificed discharge wall for supplying a plurality of streams of molten glass to be attenuated into filaments comprising inserting elements in apertures in a member; sealing said elements and member within a water soluble glass coating capable of isostatically transmitting pressure to said member and elements; hot isostatically pressing to the sealed elements and member to intimately bond the elements to the member; forming an orifice in said elements to permit the passage of molten glass therethrough to establish said streams.

17 Claims, 3 Drawing Figures

METHOD OF MAKING GLASS FIBER FORMING FEEDERS AND FEEDER FORMED THEREBY

TECHNICAL FIELD

The invention disclosed herein relates to the production of glass fibers and glass fiber forming feeders.

BACKGROUND ART

With the production of glass fiber forming feeders having an ever-increasing number of orifices or tips to supply the streams of molten material to be attenuated into filaments, the need for effective and efficient systems for attaching the orificed tips or elements in the apertures in the discharge wall has also increased. Previously, the individual projections or tips were welded to the discharge wall by conventional welding techniques, such as cold resistance welding, electron beam welding, and laser welding and the like. In essence, each of these systems welded a single tip at a time. With fiber forming feeders having as many as 4,000 or more tips, the welding process can be quite time consuming. Further, there are other problems associated with the systems which are well known in the art.

DISCLOSURE OF THE INVENTION

This invention pertains to a method of making an orificed discharge wall for supplying a plurality of streams of molten glass to be drawn into filaments comprising: inserting elements in apertures in a member; hermetically sealing said elements and member within a water soluble glass coating capable of isostatically transmitting pressure to said member and elements; hot isostatically pressing the sealed elements and member to intimately bond the elements to the member; and forming an orifice in said elements to permit the passage of molten glass therethrough to establish said streams.

BEST MODE OF CARRYING OUT THE INVENTION

Figure 1:
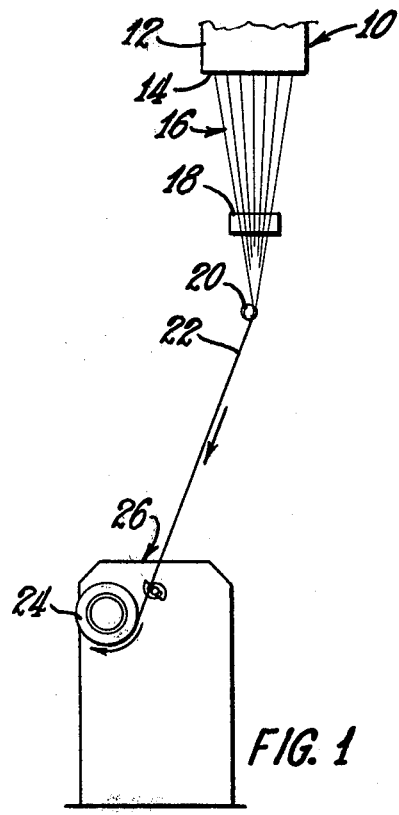
FIG. 1 is a semi-schematic front elevational view of a glass textile type fiber forming system.

As shown in FIG. 1, feeder 10, which is comprised of containment or sidewalls 12 and an orificed bottom or discharge wall 14, is adapted to provide a plurality of streams of molten inorganic material, such as glass, through a plurality of orificed elements 85. Feeder 10, including discharge wall 14, is adapted to be electrically energized to heat the glass therein. The streams of molten glass can be attenuated into filaments 16 through the action of winder 26 or any other suitable means.

As is known in the art, size applicator means 18 is adapted to provide a coating or sizing material to the surface of the glass filaments which advance to gathering shoe or means 20 to be collected as an advancing strand or bundle 22. Strand 22 is then wound into package 24 upon a collet of winder 26 as is known in the art. Thus, FIG. 1 schematically represents a "textile" fiber forming system.

Figure 2:
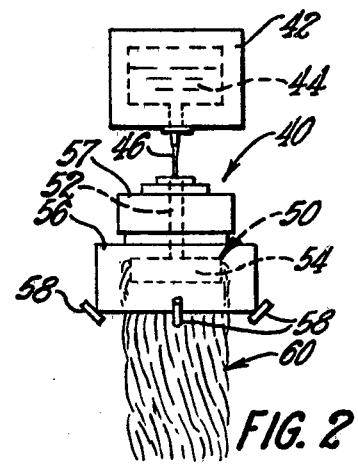
FIG. 2 is a semi-schematic front elevational view of a glass wool or rotary fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds, is comprised of a quill 52 and a circumferential fiberizing or discharge wall 54 having a plurality of orificed elements 85 adapted to supply a plurality of streams of molten inorganic material to be fiberized. Such elements may be flush with the exterior surface of the wall or project outwardly therefrom.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58 as is known in the art.

As is shown in the drawings, member 69 of the fiberization or discharge walls 14 or 54 of the feeders 10 and 50, respectively, may be based upon a laminate comprised of a refractory metal core 70 having an oxygen impervious, precious metal sheath intimately bonded thereto by hot isostatic pressing (i.e., HIP) as is disclosed in my patent application Ser. No. 200,677, filed on Oct. 27, 1980, which is hereby incorporated by reference. Or, member 69 may be comprised entirely of any suitable material, such as a platinum and rhodium alloy which, for example, is well known in the art.

Regarding the laminated member, such refractory metals are selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V), and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particularly, the precious metals for first layer 78, second layer 79 and/or elements 85 are selected from a group consisting of platinum (Pt), paladium (Pd), iridium (Ir), osmium (Os), rhodium (Rh), ruthenium (Ru), and alloys based on such metals. Included in the platinum alloys are H alloy and J alloy which are alloys of platinum and rhodium of 90%/10% and 75%/25% composition, respectively. In essence, the laminate is comprised of a plurality of layers of material wherein one of said layers is a refractory metal, and another of said layers is an oxygen impervious, precious metal, said plurality of layers being intimately bonded together by the simultaneous application of isostatic pressure and heat to form a unitary laminate.

Figure 3:
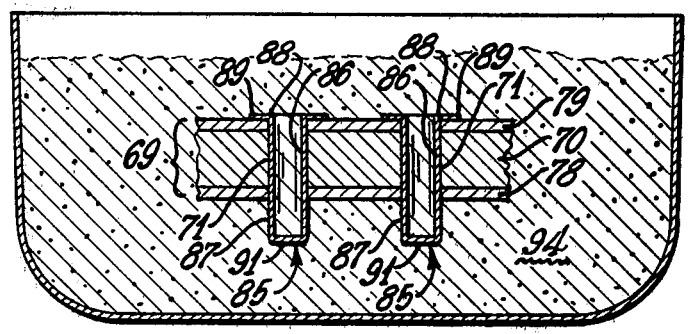
FIG. 3 is an enlarged cross-sectional view of the discharge wall of the feeder shown in FIG. 1 during processing according to the principles of this invention.

FIG. 3 depicts a portion of a discharge wall at a point during fabrication according to the principles of this invention. As such, elements or tips 85 are positioned or inserted in a plurality of apertures 71 in member 69. As shown, element 85 is comprised of a sleeve 87 having a flange 89 extending outwardly from first end 88 of sleeve 87. Second end 91 of sleeve 87 is shown closed. However, it is to be understood that second end 91 may be open such that orifice 86 extends completely through sleeve 87. In any event, element 85 is finished such that orifice 86 provides a path for the molten glass to pass therethrough to establish the molten streams at the discharge wall 14.

The contacting portions of element 85 and member 69 should be in firm abutting engagement, including flange 89 if employed.

With elements 85 properly inserted in member 69, member 69 is positioned in or immersed in a bed or body of particles of water soluble glass 94. Conveniently, the bed of particles 94 is readily retained in container 99. Container 99 may be formed of any suitable high temperature resistant material capable of withstanding the temperatures employed in the "fusing" step.

Container 99, containing powder 94 with member 69 having elements 85 suitably positioned therein, is then heated to a temperature sufficient to melt or fuse the glass powder to hermetically seal the member and elements in a sheath of glass. Preferably, the heating or fusing step is done under a vacuum, such as in a vacuum annealing furnace to also remove any residual gases that may reside between the member 69 and elements 85.

If the fusion step is performed in a separate oven or furnace, that is, other than the hot isostatic pressing chamber, the coated assembly should be permitted to cool below the solidification point of the coating to permit handling of the coated assembly and to prevent the diffuse of air into or through the fused coating.

To provide a proper intimate or metallurgical bond between the elements 85 and member 69, the coating material should satisfy three basic requirements for use in a hot isostatic pressing chamber. First, the coating material must be high temperature resistant. That is, the coating must be able to withstand the temperatures employed in the hot isostatic pressing step. Second, the coating must form a gas tight or hermetical seal to prevent the working fluid in the HIP chamber from entering between member 69 and elements 85 which may adversely affect the bonding therebetween. And yet, thirdly, the coating must be sufficiently pliable to be able to transmit the pressure applied thereto in the HIP chamber isostatically to the member and the elements. Yet the coating must not be of too low a viscosity at the desired hipping temperature, otherwise the coating may itself flow between member 69 and elements 85 or simply wash away therefrom.

Preferably, the glass particles 94 are comprised of a water soluble glass to permit the easy removal of the coating from the member 69 subsequent to hot isostatic pressing by merely immersing the coated member in a body of water. The water may be heated to accelerate such action.

Suitable water soluble glasses, consisting essentially of $SiO_2$ and $Na_2O$, have been found to satisfy these requirements. Such sodium silicate glasses preferably contain from about 55% to about 80% $SiO_2$. More preferably, the $SiO_2$ comprises from about 60% to about 70% of said glass. Tips have been bonded to orificed plates employing commercially available glass compositions of sodium silicate glass having a $SiO_2$ component of about 66% of the glass.

With regard to viscosity of the coating material at the temperature at which the hot isostatic pressing step is carried out, the coating should have a viscosity greater than about 500 poise at such temperatures. However, a coating exhibiting a viscosity at such temperatures is more preferable within the range from about 500 poise to about 3,500 poise to provide the proper pressure transmitting and sealing characteristics.

If the fused coating has cooled to below the solidification temperature thereof, the coating is preferably heated to above the softening point or temperature prior to any substantial application of pressure to prevent the fracture of the glass coating by the pressure. This may conveniently be accomplished within the HIP chamber.

It is to also be understood that the fusion step may be carried out within the hot isostatic pressure chamber. This may be more readily accomplished in HIP chambers adapted to draw a sufficient vacuum during heating to remove any residual gases from between member 69 and elements 85. With the fusion step performed in a HIP chamber, the cooling cycle may be dispensed with and the application of isostatic pressure may proceed directly.

According to the foregoing procedures, if a tip 85, as shown in FIG. 3, is employed, the flange 89 will be intimately bonded to one surface of member 69, and sleeve 87 will be intimately bonded to the walls of aperture 71 in member 69. Further, if a refractory metal/previous metal laminate and a precious metal insert 85 are employed, the sleeve 87 of element 85 will fuse to core 70 and layers 78 and 79 to seal the refractory metal within a protective layer of oxygen impervious, previous metal to prevent the oxidation of the refractory metal at elevated, or glass fiber forming, temperatures.

It is to be understood that element 85 may be of any suitable shape, for example, flange 89 may be dispensed with and/or the length of sleeve 87 may also be substantially equal to the thickness of member 69 to provide a tipless orifice plate having orifices lined with a suitable material intimately bonded to member 69.

An apertured platinum/rhodium plate or member was fitted with a plurality of platinum/rhodium tips or elements similiar to that shown in FIG. 3. The plate having the tips suitably pressed therein was placed in a molybdenum foil container and packed in a powder of water soluble glass particles (at a $SiO_2/Na_2O$ ratio of 3.22:1). The packed container was then covered with a molybdenum foil lid to confine the glass powder during the subsequent vacuum fusion treatment. The container was closed, but not sealed, to permit the withdrawal of the gases from the powder and between the elements and plate. The loaded container was then placed in a vacuum annealing furnace and the temperature was gradually raised to about 900° C. while applying a hard vacuum. The furnace was held at 900° C. under hard vacuum for about one hour to insure that substantially all the trapped air between the tips and the plate was removed.

The container was then removed from the furnace after cooling to a temperature below the flow point of the glass (approximately 840° C.) to insure that upon removal from the vacuum furnace, air will not diffuse into the fused glass block or coating.

The container having the fused glass body containing the plate and tips was positioned in the autoclave of a hot isostatic pressing unit and heated to the softening point of the glass (about 655° C.) at the lowest permissible pressure for operation of the HIP unit. After reaching the softening temperature, the pressure within the HIP unit was gradually increased to about 15,000 PSI while gradually increasing the temperature within the HIP unit to about 1,100° C. That pressure and temperature were maintained for about two hours to diffusion bond the tips to the plate.

After cooling, the foil container was removed and the glass body containing the plate was placed in a water bath to dissolve the coating to prepare the orificed plate for further fabrication into a complete fiber forming feeder.

It is to be understood that the methods disclosed herein may be employed in preparing the laminated, orificed discharge wall for a glass fiber forming feeder set forth in U.S. Pat. No. 4,342,578 issued Aug. 3, 1982 wherein the laminate is simultaneously bonded together as well as bonding the tips thereto.

From the foregoing, it can be seen that the present invention is applicable to the joining of the precious metal elements to the laminated walls or members as disclosed in, for example, U.S. Pat. No. 4,342,577, issued Aug. 3, 1982, in the names of Mohinder S. Bhatti and Alfred Marzocchi; and/or U.S. Pat. No. 4,343,636, issued Aug. 10, 1982, in my name which are hereby incorporated by reference.

It is apparent that within the scope of the present invention, modifications and different arrangements can be made other than as herein disclosed. The present disclosure is merely illustrated, with the invention comprehending all variations thereof.

INDUSTRIAL APPLICABILITY

The invention disclosed herein is readily applicable to the formation of continuous and/or staple glass filaments.

I claim:

1. A method of forming an orificed discharge wall for a feeder for supplying molten streams of glass to be attenuated into filaments comprising:
    inserting elements in apertures in a member;
    immersing said member containing said elements in a bed of particles of water soluble glass;
    heating said bed of particles under a vacuum to fuse said particles to hermetically seal said member and elements in a high temperature resistant and pressure transmittable coating of water soluble glass and to remove residual gases from between said member and elements;
    hot isostatically pressing said hermetically sealed member and elements to intimately bond the elements to said member;
    contacting the coating with water to remove said coating; and
    forming an orifice in said elements to permit the passage of molten glass therethrough to establish said streams.

2. The method of claim 1 wherein said glass consists essentially of $SiO_2$ and $Na_2O$.

3. The method of claim 2 wherein said $SiO_2$ comprises from about 55% to about 80% of said glass.

4. The method of claim 3 wherein said $SiO_2$ comprises from about 60% to about 70% of said glass.

5. The method of claim 1 wherein said glass has a viscosity within the range from about 500 poise to about 3,500 poise at the temperature at which said hot isostatic pressing step is carried out.

6. The dischare wall produced according to the method of claim 1.

7. A method of making an orificed discharge wall for supplying a plurality of streams of molten inorganic material to be drawn into filaments comprising:
    inserting elements in apertures in a member;
    contacting said member containing said elements with a layer of fusible particles;
    fusing said particles to seal said member and elements in a coating that remains highly viscous at elevated temperatures;
    cooling said fused coating to a temperature below the solidification temperature of said coating;
    heating said member having the solidified coating thereon to at least the softening temperature of said coating to render said coating capable of isostatically transmitting pressure to said member and elements while retaining said member and elements hermetically sealed within said coating; and
    hot isostatically pressing said coated member and elements to metallurgically bond said elements to said member; and
    forming orifices in said elements to permit the passage of said molten material therethrough to establish said streams.

8. The method of claim 7 wherein said fusing step is comprised of heating said particles under a vacuum to hermetically seal said member and elements in said coating and to remove residual gases from between said member and elements.

9. The method of claim 8 wherein said fusible particles are a water soluble glass.

10. The method of claim 9 wherein said glass consists essentially of $SiO_2$ and $Na_2O$.

11. The method of claim 10 wherein said $SiO_2$ comprises from about 55% to about 80% of said glass.

12. The method of claim 10 wherein said glass has a viscosity greater than about 500 poise.

13. The method of claim 9 wherein said member is a laminate comprised of a plurality of layers of material wherein one of said layers is a refractory metal and another of said layers is an oxygen impervious, precious metal, said plurality of layers being intimately bonded together by hot isostatic pressing to form a unitary laminate.

14. The method of claim 10 wherein the refractory metal layer is a material selected from the group consisting of Ti, V, Cb, Ta, Cr, Mo, W, Re and base alloys thereof and wherein said precious metal layer is a material of the group consisting of Pt, Pd, Ir, Os, Rh, Ra and base alloys thereof.

15. The method of claim 10 wherein said elements are selected from the group consisting of Pt, Pd, Ir, Os, Rh, Ru and base alloys thereof.

16. A method of forming an orificed discharge wall for supplying a pluralty of streams of molten glass to be drawn into filaments comprising:
    inserting elements in apertures in a member;
    sealing said member containing said elements within a water soluble glass coating capable of isostatically transmitting pressure to said member and elements;
    hot isostatically pressing the sealed member and elements to intimately bond the elements to said member; and
    forming an orifice in said elements to permit the passage of molten glass therethrough to establish said streams.

17. The discharge wall produced according to the method of claim 16.

* * * * *